United States Patent [19]

Iizuka

[11] 4,437,734
[45] Mar. 20, 1984

[54] LENSES CAPABLE OF CLOSE-UP PHOTOGRAPHY
[75] Inventor: Yutaka Iizuka, Tokyo, Japan
[73] Assignee: Nippon Kogaku K.K., Tokyo, Japan
[21] Appl. No.: 294,524
[22] Filed: Aug. 20, 1981
[30] Foreign Application Priority Data
Aug. 27, 1980 [JP] Japan ................. 55-116923
[51] Int. Cl.³ .......................... G02B 9/62; G02B 13/02
[52] U.S. Cl. ....................................................... 350/454
[58] Field of Search ......................... 350/423, 454–457
[56] References Cited
U.S. PATENT DOCUMENTS

4,113,357  9/1978  Nakamura ............................ 350/454
4,240,703  12/1980  Momiyama ..................... 350/454 X
4,348,084  9/1982  Kitagishi et al. ..................... 350/454
4,359,272  11/1982  Kreitzer ............................... 350/455

Primary Examiner—John K. Corbin
Assistant Examiner—Scott J. Sugarman
Attorney, Agent, or Firm—Shapiro and Shapiro

[57] ABSTRACT

A lens system comprises a converging first lens group, a diverging second lens group and a converging third lens group arranged in this order as viewed from the object side. The lens can focus continuously from infinity down to a very short object distance by moving only the diverging second lens forward and rearward along the optical axis. The paraxial rays exiting from the second lens group and incident on the third lens group are kept always substantially in parallel with the optical axis throughout all the moving range for focusing of the second lens group.

9 Claims, 15 Drawing Figures

$\beta = 1.0$

SPHERICAL ABERRATION

ASTIGMATISM

DISTORTION

LATERAL ABERRATION

$\beta = 1.0$

| SPHERICAL ABERRATION | ASTIGMATISM | DISTORTION |

LATERAL ABERRATION

$\beta = 1.0$

| SPHERICAL ABERRATION | ASTIGMATISM | DISTORTION |
|---|---|---|
|  |  |  |

FIG. 14

LENSES CAPABLE OF CLOSE-UP PHOTOGRAPHY

BACKGROUND OF THE INVENTION

1. Field of the Invention

The present invention relates to a photographic lens which can focus from infinity to a very close distance. In particular, the present invention is directed to such photographic lens which can be used at 1:1 magnification at maximum.

2. Description of the Prior Art

Lenses hitherto known useful for photography at a very short object distance are classified into two groups.

(1) Lenses of the type comprising a common photographic lens and a supplementary lens for close-up photography (so-called close-up lens) mounted on the common photographic lens;

(2) Lenses of the type which are particularly designed for short distance photography. This type of lens is, when used, shifted forward as a unit from the film plane.

These known systems for photographing a very close object have the following disadvantages in any case:

In the case of the first mentioned system it is impossible to continuously change the magnification at which photography is carried out. For photography within a desired range of magnification, a number of supplementary lenses are required. In addition, exchange of such supplementary lenses is very troublesome to the user.

In the case of the latter mentioned system, it is possible to continuously change the magnification. However, a large and complicated mechanism is needed for shifting the lens. If portability is a consideration, the range of focusing movement available for the lens is limited. For the known system, the available photographic magnification is generally in the order of ×0.5 at most.

Furthermore, it is desired that a close-up photographic lens satisfy various requirements at the same time. The lens should not only be able to take a photography approaching the object but also to take a photograph at a sufficiently large magnification while keeping a sufficiently large distance from the object to the lens (working distance). The lens should also be as small as possible in size. All of the lenses according to the prior art can not fully satisfy these requirements at the same time.

SUMMARY OF THE INVENTION

Accordingly, it is the primary object of the invention to provide a photographic lens capable of close-up photography which enables changing the magnification continuously in a simple manner and which is workable with a sufficiently large working distance and with a maximum photographic magnification reaching 1:1 magnification.

The present invention is based on the so-called inner-focusing type telephoto lens as disclosed in our U.S. Pat. No. 4,113,357 (Japanese Patent Applications Laid Open Nos. 78326/1976; 55639/1977 and 134425/1978). The inner-focusing telephoto lens according to the prior invention comprises a converging first lens group, a diverging second lens group and a converging third lens group of which only the diverging second lens group is moved for focusing. This prior art lens system has an advantage that for a long focal point only a very small distance of focusing movement of the lens is needed. However, the prior art lens system has not been designed to include means for obtaining a high magnification reaching about 1:1 magnification. The present invention is directed to improvements in this type of lens system comprising three lens groups. The present invention is based on the finding that the prior art lens system comprising three lens groups can have a sufficiently long working distance, and therefore it is possible to obtain a high magnification reaching about 1:1 magnification, by a novel arrangement of the three lens groups in the lens system. The present invention has realized such a novel arrangement for attaining 1:1 magnification.

Other and further objects, features and advantages of the invention will appear more fully from the following description taken in connection with the accompanying drawings.

BRIEF DESCRIPTION OF THE DRAWINGS

FIG. 1 is a schematic view of an optical system in the paraxial area showing the fundamental arrangement of the lens system according to the invention, in which

DESCRIPTION OF THE PREFERRED EMBODIMENTS

Figure 1A:
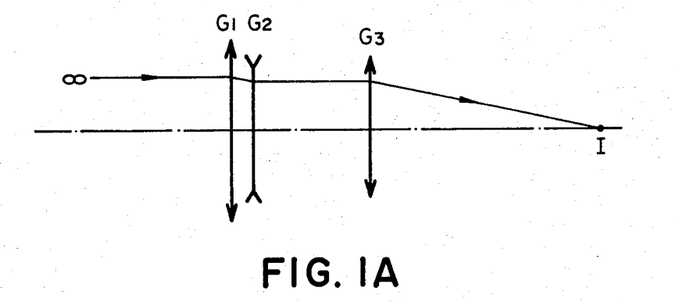
FIG. 1A shows the arrangement in the position for photography at infinity and FIG. 1B shows it in the position for the most close photography.
Figure 1B:
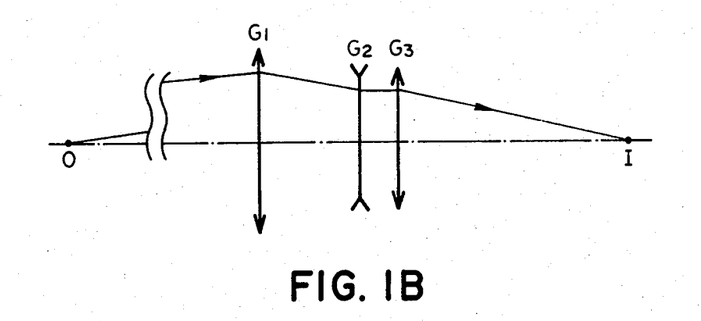

Referring first to FIG. 1 showing the fundamental arrangement of the lens system in the paraxial area according to the invention, the total system is composed of three lens groups, a converging first group $G_1$, a diverging second group $G_2$ and a converging third group $G_3$. The diverging second group $G_2$ is moved forward or backward to change the photographic magnification and also to focus the lens system on an object at the same time. Paraxial rays incident on the converging third group $G_3$ are maintained always parallel to the optical axis throughout all the range of focusing movement of the second group $G_2$. FIG. 1A shows the lens system in the use position for infinity and FIG. 1B shows it in the position for use at its maximum photographic magnification. O is an object to be photographed and I designates the position of film plane.

In the position set for infinity shown in FIG. 1A, the focal length of the whole system can be represented by the following equation:

$$f = f_1 \cdot f_3 / (-f_2)$$

This equation may be considered from two different points of view. Firstly, consider the first and second groups $G_1$ and $G_2$ to constitute an afocal teleconverter relative to the third group $G_3$. Then, the angular magnification may be represented by $$f_1/(-f_2) \tag{A}$$

Secondly, consider the second and third groups $G_2$ and $G_3$ to be used with a magnification relative to the first group $G_1$. Then, the resultant lateral magnification of the second and third groups to the image point of the first group may be represented by $$f_3/(-f_2) \tag{B}$$

Consequently, the above formulae (A) and (B) may be considered to represent basic quantities for designing such an optical system.

Let $f_{12}$ denote the composite focal length of the first and second groups $G_1$ and $G_2$. Then, the maximum photographic magnification of the total system in the position shown in FIG. 1B in which the value of $f_{12}$ must be minimum, $(f_{12})min$, is given by $$f_3/(f_{12})min \tag{C}$$

Figure 2:
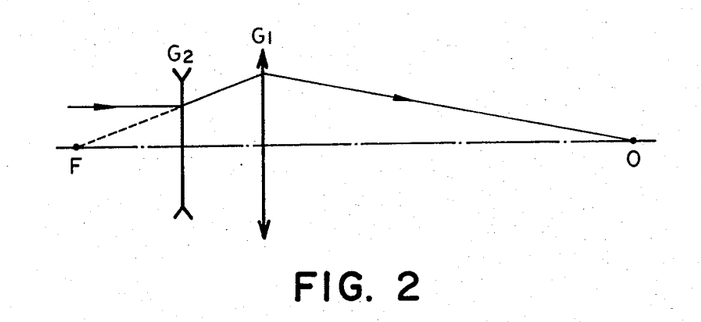
FIG. 2 shows the paraxial arrangement of only the first and second lens groups in the position for the most close photography, the arrangement being shown in the reversed direction to FIG. 1.

To explain the above in detail we refers to FIG. 2 in which the direction toward the second group $G_2$ from the object point O is reversed to that in FIG. 1B. As seen from FIG. 2, in this basic arrangement of the optical system, the reversed paraxial rays exiting from the third group (not shown) are made incident on the second group $G_2$ in parallel with the optical axis. The image point (virtual image) F of the parallel rays formed through the second group $G_2$ is projected on the object point O through the first group $G_1$. Let $\beta$ denote the lateral magnification of the first group $G_1$ at this time. Then, the composite focal length $f_{12}$ of $f_1$ and $f_2$ is given by $$f_{12}=f_2=\beta$$

This value $\beta$ becomes the minimum, $\beta min$ and also the value $f_{12}$ becomes the minimum when the spacing between the first and second groups $G_1$ and $G_2$ is maximum. Thus, $$(f_{12})min = f_2 \times \beta min \tag{D}$$

From this point of view, the composite system resulting from the first and second groups $G_1$ and $G_2$ and the third group $G_3$, in the arrangement shown in FIG. 1a, may be considered to be in the condition for use at infinity and be disposed opposite to each other. In this position, the photographic magnification of the total system is represented by the above formula (C).

The present invention has been made on the basis of the above consideration. The lens system according to the invention comprises the above mentioned three lens groups and is featured in that the three groups are so designed as to make the incident rays on the converging third group running in parallel with the optical axis throughout all the moving range for focusing of the diverging second group. Thus, the rays of light coming from an object point on axis and exiting from the second group are made incident on the third group while travelling substantially parallel with the optical axis. To realize this according to the invention, the three lens groups are so arranged as to satisfy the following conditions:

$$1.0 < f_1/|f_2| < 1.4 \tag{1}$$

$$1.6 < f_3/|f_2| \leq 2.2 \tag{2}$$

wherein, $f_1$ is the focal length of the converging first group, $f_2$ is the focal length of the diverging second group, and $f_3$ is the focal length of the converging third group.

The condition formula (1) defines the focal length ratio of the first group $G_1$ to the second group $G_2$ in the optical system according to the invention.

As previously noted in connection with the above formula (A), when the optical system is in the position for use at infinity, the first and second groups $G_1$ and $G_2$ are considered to function as an afocal telephoto converter. The condition formula (1) defines, therefore, the angular magnification of the afocal telephoto converter.

In the case of the prior art inner-focusing type telephoto lenses, a particular emphasis has been laid upon reduction of the telephoto ratio of the telephoto lens (ratio of total lens length to focal length). In other words, in designing the known telephoto lenses, one has set importance on reduction of the total lens length. For this reason, the value of $f_1/|f_2|$ used according to the prior art was far larger than the upper limit of the above condition formula (1). The value hitherto used was in the range of from 2.2 to 2.9. In this respect, the lens system according to the present invention is essentially different from the inner-focusing type telephoto lenses disclosed in U.S. Pat. No. 4,113,357.

For close-up photographic lenses to which the present invention is directed, the goal is not greater telephoto ratio, but larger photographic magnification. To this end, the first group must be used with a greater magnification. If the ratio of $f_1/|f_2|$ is made greater, then the variations of various aberrations which occur when magnification is changed will become so large that correction of the variation of aberrations may be no longer possible. For photographic at a high magnification, such undue variation of aberrations should be avoided absolutely. On the other hand, it is practically impossible to reduce the spacing between the first and second groups to zero. Therefore, the lower limit of the formula (1) can not be exceeded.

The above condition formula (2) defines the focal length ratio of the second group $G_2$ to the third group $G_3$. As seen from the previously described formula (B), the condition formula (2) defines also the composite lateral magnification of the second and third groups $G_2$ and $G_3$ to the image point of the first group $G_1$.

Use of a value exceeding the upper limit of the formula (2) may have an advantage in that the principal plane of the total system can be further advanced forward and a larger working distance can be obtained. However, it has a disadvantage in that aberrations produced in the first group are further aggravated by the second and third groups so that it is very difficult to correct the variations of aberrations that occur with changing magnification. For this reason, it is undesirable to exceed the upper limit.

Using a value exceeding the lower limit of the formula (2) may be advantageous in that the variations of aberrations can be corrected easily and a smaller F-number can be used to make the lens brighter. However, it is disadvantageous in that the amount of focusing movement required for the moving of the second group to obtain a desired magnification becomes extremely large, so that the important advantage of the invention, that is, the simplicity of focusing may be diminished or lost thereby.

As readily understood from the foregoing, the conditions represented by the above formulae (1) and (2) set forth the fundamental conditions essential for determining the respective groups' shares power to obtain the effects of the present invention.

In a further preferred embodiment of the invention, the lens system is so designed as to satisfy the following condition in addition to the above conditions:

$$1.6 \leq f_3/R \leq 4.2 \tag{3}$$

wherein, R is the length of the diagonal line of the photographic film then used, that is, the diameter of the image circle.

Since, as previously noted, the third group and the composite system resulting from the first and second groups in the optical system according to the invention are disposed opposed to each other in the condition for use at infinity, a larger maximum photographic magnification can be obtained by increasing the focal length $f_3$ of the third group $G_3$. On the other hand, this adversely affects the variations of aberrations produced in the first and second groups at the change of magnification. When the upper limit of the above condition formula (3) is exceeded, it is possible to correct the variation of aberrations. Furthermore, when the lower limit is exceeded, it is difficult to increase the maximum photographic magnification. This is contrary to the objects of the invention.

In a still further preferred embodiment of the invention, the lens system is so designed as to satisfy the following condition in addition to the above conditions:

$$1.6 \leq |\beta min| \leq 4 \tag{4}$$

wherein, $\beta min$ is the minimum lateral magnification of the first group in the opposite direction.

As will be understood from the fundamental arrangement of the present system described above referring to FIGS. 1 and 2, the maximum photographic magnification of the total system is given by the following formula after substituting the above formula (D) in (C):

$$f_3/(\beta min \cdot f_2)$$

Therefore, a larger magnification of the total system can be obtained by decreasing the value $|\beta min|$. However, it is undesirable for the value to exceed that lower limit of the formula (4). If the lower limit is exceeded, then it becomes difficult to correct the variations of aberrations that occur at the change of magnification even when the first group is formed as a considerably thick lens. On the other side, if the upper limit of the condition (4) is exceeded, this will result in reduction of the maximum photographic magnification. Of course, this is contrary to the objects of the present invention.

As to the structure of the first lens group $G_1$, it is preferable that the first group be composed of two sets of positive lenses including a cemented lens. If the first group is composed of only a cemented positive lens or single positive lens, it is not possible to correct the aberration variations that occur in the first group at the time of magnification change. Use of three or more sets of positive lenses including a cemented lens is not recommended for the first group, because consequent further improvement in correction of aberration is small. Increasing the number of lenses up to three or more sets of positive lenses in the first group can not significantly increase the correction of the variation of aberrations produced in the first group. Therefore, it is necessary and sufficient for the first group to be composed of two sets of positive lenses including a cemented lens. The primary function of the cemented lens in the first group is, of course, to correct chromatic aberration.

As to the structure of the first group consisting of two sets of positive lenses, it has been further found to be preferable that the positive lenses be so designed as to satisfy the following conditions:

$$-0.25 < (r_b + r_a)r_b - r_a < +0.15 \tag{5}$$

$$+0.5 < (r_d + r_c)r_d - r_c < +1.5 \tag{6}$$

wherein, $r_a$ is the radius of curvature of the front surface of the front positive lens of the first group;

$r_b$ is that of the rear surface thereof;

$r_c$ is the radius of curvature of the front surface of the rear positive lens of the first group; and $r_d$ is that of the rear surface thereof.

Since the lens system of the invention is intended to be useful for close-up photography, it is essential to obtain adequate magnification for this purpose. In particular, the first group must be used while changing the magnification over a broad range from infinity to close object. Therefore, it is desirable that the first group be a lens group sufficiently corrected as to the variation of aberrations induced by changing the photographic magnification. For this reason, the forms of the respective lenses constituting the first group must be different from those of common photography lenses. When the lower limit of the above formula (5) is exceeded, the spherical aberration produced at the time of close-up photography will become unduly large in the positive direction, and the field curvature will become unduly large in the negative direction at the time of photography at infinity. When the upper limit of the formula (5) is exceeded, there will be produced similar problems of aberrations but in the reversed direction to the above. If the lower limit of the above formula (6) is exceeded, then both of spherical aberration and field curvature become too large to correct throughout all the range for photography. On the contrary, if the upper limit of the formula (6) is exceeded, then there will be produced similar problems of aberrations in reverse to the above.

The second group $G_2$ is preferably composed of a cemented concavo-concave negative lens. In a preferred embodiment of the cemented negative lens, the following condition is satisfied:

$$-0.5 < (r_8 + r_6)/r_8 - r_6 < 0 \tag{7}$$

wherein, $r_6$ is the radius of curvature of the surface at the object side of the cemented negative lens; and $r_8$ is the radius of curvature of the surface at the image side of the same lens.

Since the photographic magnification is changed by moving the second group along the optical axis, the beam of light incident on the second group enters the latter at different positions for different magnifications.

Therefore, the second group has to be designed taking into consideration thoroughly such change of incidence position of the beam on the second group. If the lower limit of the formula (7) is exceeded, spherical aberration will become intolerably large in the negative direction throughout all the photographic range, and field curvature at the time of photography at infinity will also become excessive in the negative direction. If the upper limit is exceeded, the aberrations become worse in the reversed direction to the above so that it is difficult to obtain well balanced and compensated aberrations throughout all the variable range of magnification.

The third group can be formed using any suitable type lens system hitherto known. A preferred lens structure of the third group which is simple in structure, long in focal length and effective to correct aberrations, comprises a first meniscus lens component, a second meniscus lens component and a positive lens component arranged in this order as viewed from the object side. The first meniscus lens component comprises a positive lens and a negative lens cemented together with its convex surface facing toward the object side. The second meniscus lens component is a negative meniscus lens component with its convex surface facing toward the image side.

The following examples, Examples 1 to 3 illustrate three preferred embodiments of the present invention by data tables of elements of the respective lens components used in the preferred lens systems. In all the tables in the following examples, r is radius of curvature of lens surface;
d is thickness at the center of lens and air spacing;
nd is refractive index of lens;
νd is Abbe number of lens;
M is photographing magnification of the total system;
$d_0$ is distance from the object to the first surface, that is, working distance;
R is diameter of image circle; and
Bf indicates back-focus.

Elements are given arranged in the order of lens surface as viewed from the object field side.

EXAMPLE 1

| $f_\infty$ = 121.168 | | F-number 4 | |
|---|---|---|---|
| r | d | nd | νd |
| 1 | 161.530 | 1.5000 | 1.80518 | 25.5 |
| 2 | 43.284 | 10.0000 | 1.71300 | 53.9 |
| 3 | −181.654 | .2000 | 1.0 | |
| 4 | 73.861 | 5.5000 | 1.71300 | 53.9 |
| 5 | −1704.595 | $d_5$ = Variable | 1.0 | |
| 6 | −108.243 | 4.7000 | 1.78470 | 26.1 |
| 7 | −34.631 | 2.3000 | 1.69680 | 55.6 |
| 8 | 49.671 | $d_8$ = Variable | 1.0 | |
| 9 | 26.350 | 13.6000 | 1.71300 | 53.9 |
| 10 | 250.000 | 2.9000 | 1.72342 | 38.0 |
| 11 | 27.045 | 25.7 | 1.0 | |
| 12 | −15.884 | 2.4000 | 1.78470 | 26.1 |
| 13 | −21.077 | .1000 | 1.0 | |
| 14 | 70.700 | 4.7000 | 1.62280 | 56.7 |
| 15 | −123.414 | | 1.0 | |
| M | 0 | −0.504 | −1.002 | |
| $d_0$ | ∞ | 295.169 | 175.712 | |
| $d_5$ | 0.925 | 16.141 | 31.167 | |
| $d_8$ | 36.408 | 21.192 | 6.166 | |
| Bf | 58.798 | 58.798 | 58.798 | |
| $f_1$ | 60.484 | $f_1/|f_2|$ | 1.15 | |
| $f_2$ | −52.5 | $f_3/|f_2|$ | 2.0 | |
| $f_3$ | 105.173 | $f_3/R$ | 2.43 | |
| R | 43.28 | β min | 2.0 | |

Diaphragm plane is 1.8 before $r_9$.

EXAMPLE 2

| $f_\infty$ = 162.0 | | F-number 4 | |
|---|---|---|---|
| r | d | nd | νd |
| 1 | 240.000 | 7.0000 | 1.71300 | 53.9 |
| 2 | −179.034 | .1800 | 1.0 | |
| 3 | 110.000 | 11.7000 | 1.71300 | 53.9 |
| 4 | −92.000 | 1.5000 | 1.80518 | 25.5 |
| 5 | 552.084 | $d_5$ = Variable | 1.0 | |
| 6 | −148.000 | 4.5000 | 1.78470 | 26.1 |
| 7 | −49.474 | 2.0000 | 1.69680 | 55.6 |
| 8 | 72.112 | $d_8$ = Variable | 1.0 | |
| 9 | 34.350 | 17.4594 | 1.71300 | 53.9 |
| 10 | 320.945 | 3.7230 | 1.72342 | 38.0 |
| 11 | 34.066 | 27.345 | 1.0 | |
| 12 | −20.865 | 3.0811 | 1.78470 | 26.1 |
| 13 | −27.057 | .1284 | 1.0 | |
| 14 | 90.763 | 6.0338 | 1.62280 | 56.9 |
| 15 | −153.699 | | 1.0 | |
| M | 0 | −0.501 | −1.000 | |
| $d_0$ | ∞ | 412.0 | 250.5 | |
| $d_5$ | 2.351 | 27.351 | 52.351 | |
| $d_8$ | 55.903 | 30.903 | 5.903 | |
| Bf | 79.515 | 79.651 | 79.559 | |
| $f_1$ | 90.0 | $f_1/|f_2|$ | 1.2 | |
| $f_2$ | −75.0 | $f_3/|f_2|$ | 1.8 | |
| $f_3$ | 135.0 | $f_3/R$ | 3.12 | |
| R | 43.28 | β min | 1.8 | |

Diaphragm plane is 1.215 before $r_9$.

EXAMPLE 3

| $f_\infty$ = 106.25 | | F-number 4 | |
|---|---|---|---|
| r | d | nd | νd |
| 1 | 162.000 | 1.3868 | 1.80518 | 25.5 |
| 2 | 41.950 | 9.2456 | 1.71300 | 53.9 |
| 3 | −142.482 | .1849 | 1.0 | |
| 4 | 66.000 | 5.0850 | 1.71300 | 53.9 |
| 5 | 1678.852 | $d_5$ = Variable | 1.0 | |
| 6 | −88.300 | 4.0051 | 1.78470 | 26.1 |
| 7 | −29.511 | 1.9599 | 1.69680 | 55.6 |
| 8 | 43.347 | $d_8$ = Variable | 1.0 | |
| 9 | 20.450 | 10.9929 | 1.71300 | 53.9 |
| 10 | 202.077 | 2.3441 | 1.72342 | 38.0 |
| 11 | 21.393 | 17.5 | 1.0 | |
| 12 | −12.348 | 1.9399 | 1.78470 | 26.1 |
| 13 | −17.036 | .0808 | 1.0 | |
| 14 | 55.000 | 1.5000 | 1.71300 | 53.9 |
| 15 | 30.500 | 6.5000 | 1.50137 | 56.5 |
| 16 | −42.981 | | 1.0 | |
| M | 0 | −0.500 | −1.000 | |
| $d_0$ | ∞ | 263.0 | 156.9 | |
| $d_5$ | 11.184 | 25.9 | 40.616 | |
| $d_8$ | 35.581 | 20.865 | 6.149 | |
| Bf | 46.256 | 46.297 | 46.269 | |
| $f_1$ | 55.921 | $f_1/|f_2|$ | 1.25 | |
| $f_2$ | −44.737 | $f_3/|f_2|$ | 1.9 | |
| $f_3$ | 85.0 | $f_3/R$ | 1.96 | |
| R | 43.28 | β min | 1.9 | |

Diaphragm plane is 0.765 before $r_9$.

Figure 3:
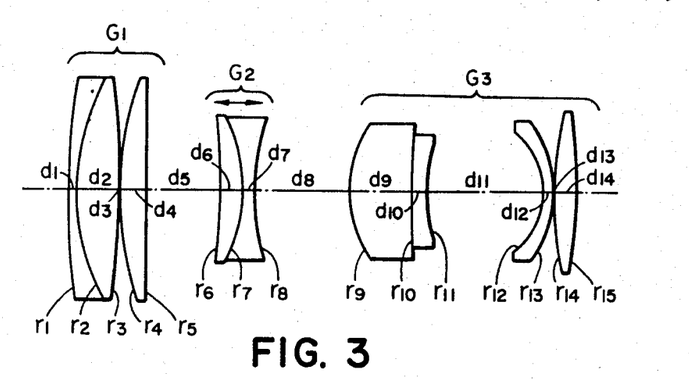
FIG. 3 shows the arrangement of lens components in the lens system shown in Example 1 and FIGS. 4, 5 and 6 show aberrations thereof for infinity, for ½ magnification and for 1.0 magnification, respectively.
Figure 4:
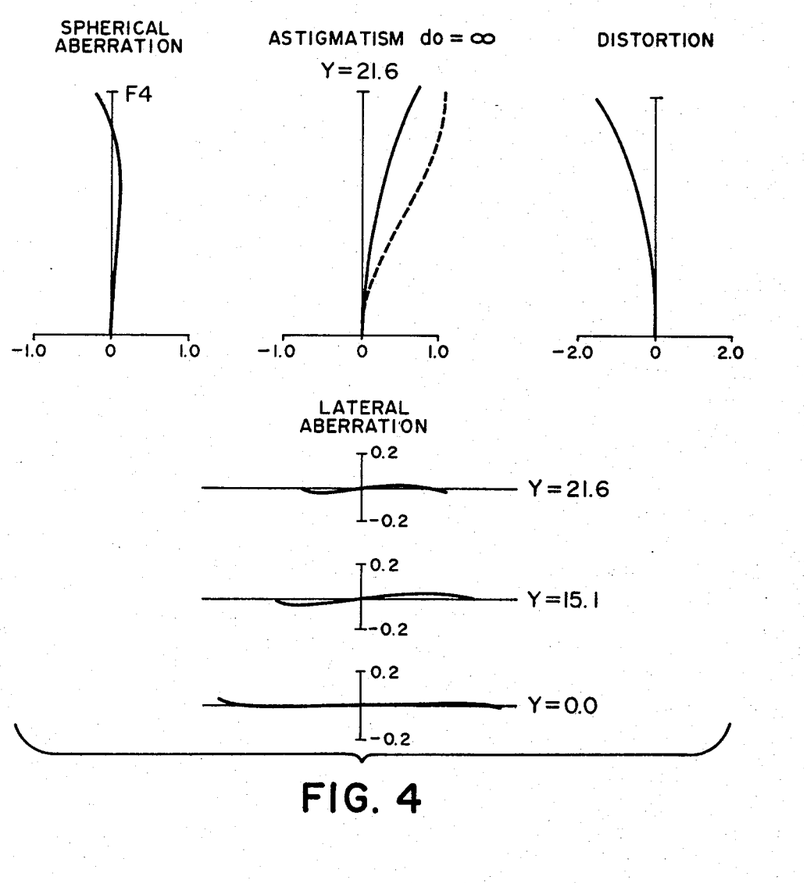
Figure 5:
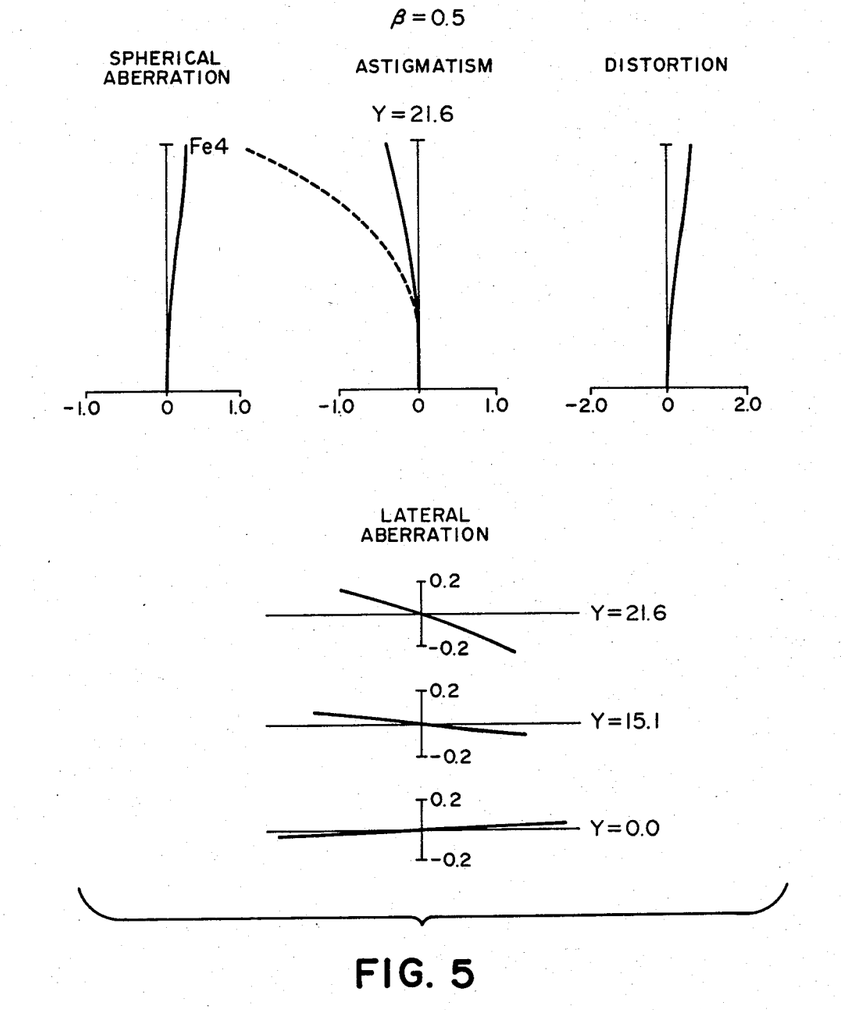
Figure 6:
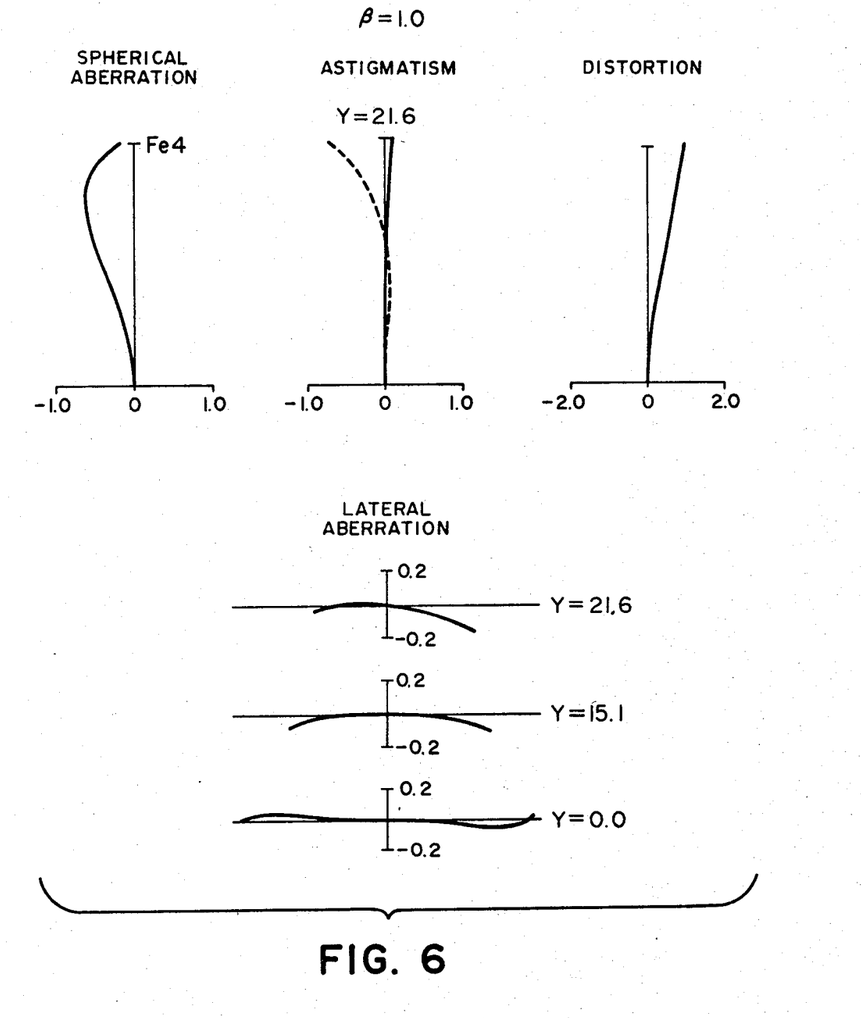

FIG. 3 shows the arrangement of component lenses according to the first embodiment of the invention shown in Example 1. FIGS. 4, 5 and 6 show aberrations of the lens system for object distance $d_0 = \infty$, for photographic magnification $\beta = 0.5$ and for $\beta = 1.0$, respectively.

Figure 7:
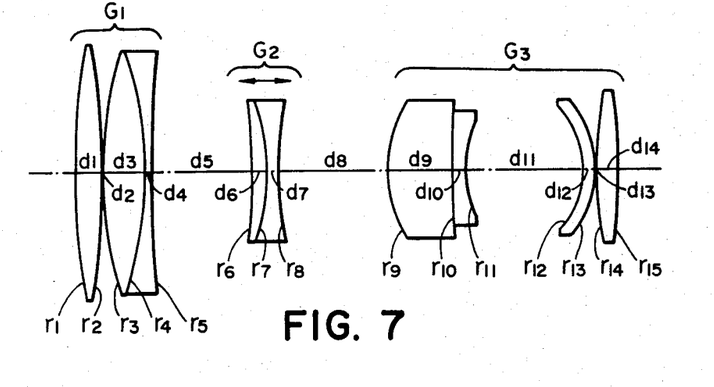
FIG. 7 shows the lens arrangement of Example 2 and FIGS. 8, 9 and 10 show aberrations thereof for infinity, for ½ magnification and for 1.0 magnification, respectively.
Figure 8:
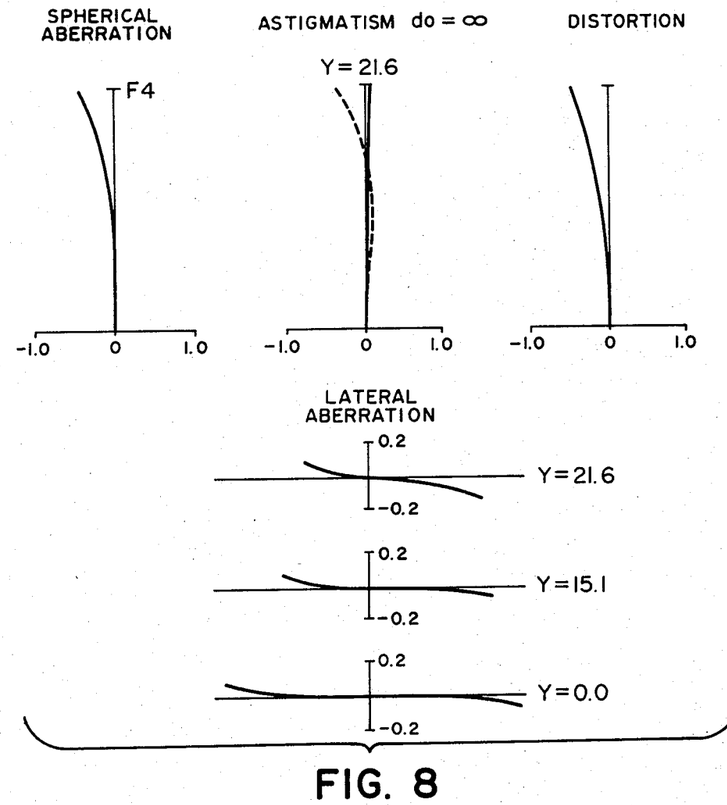
Figure 9:
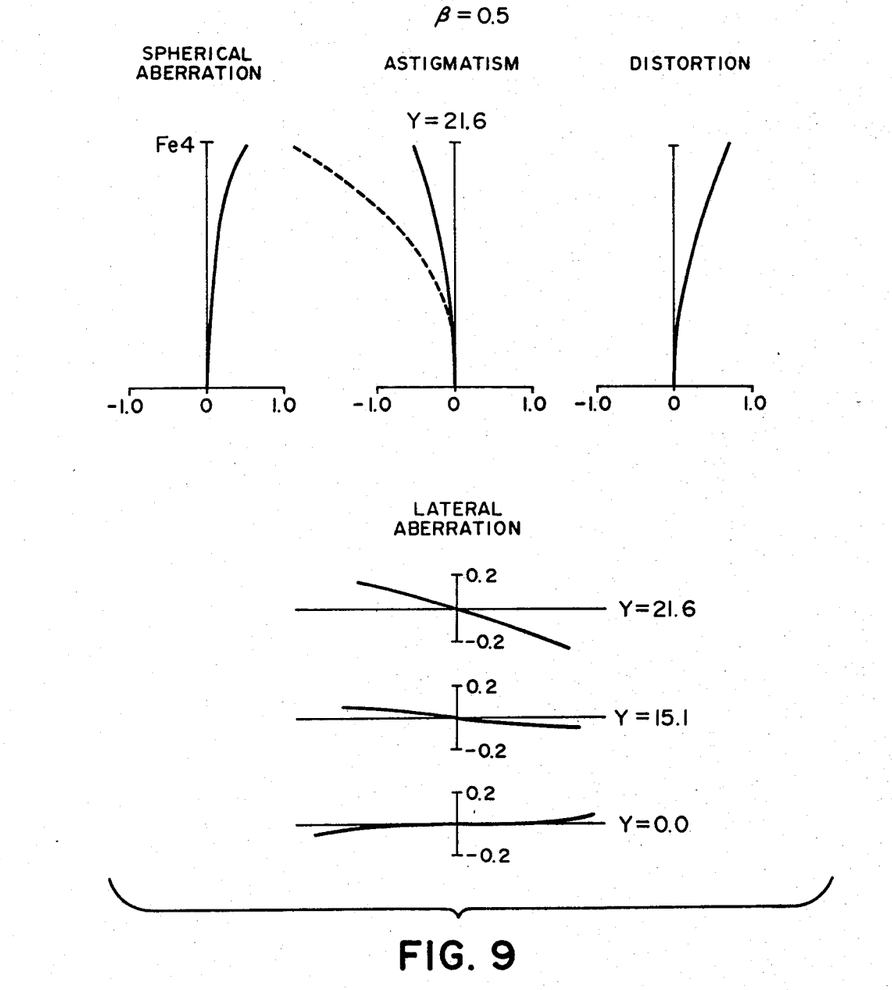
Figure 10:
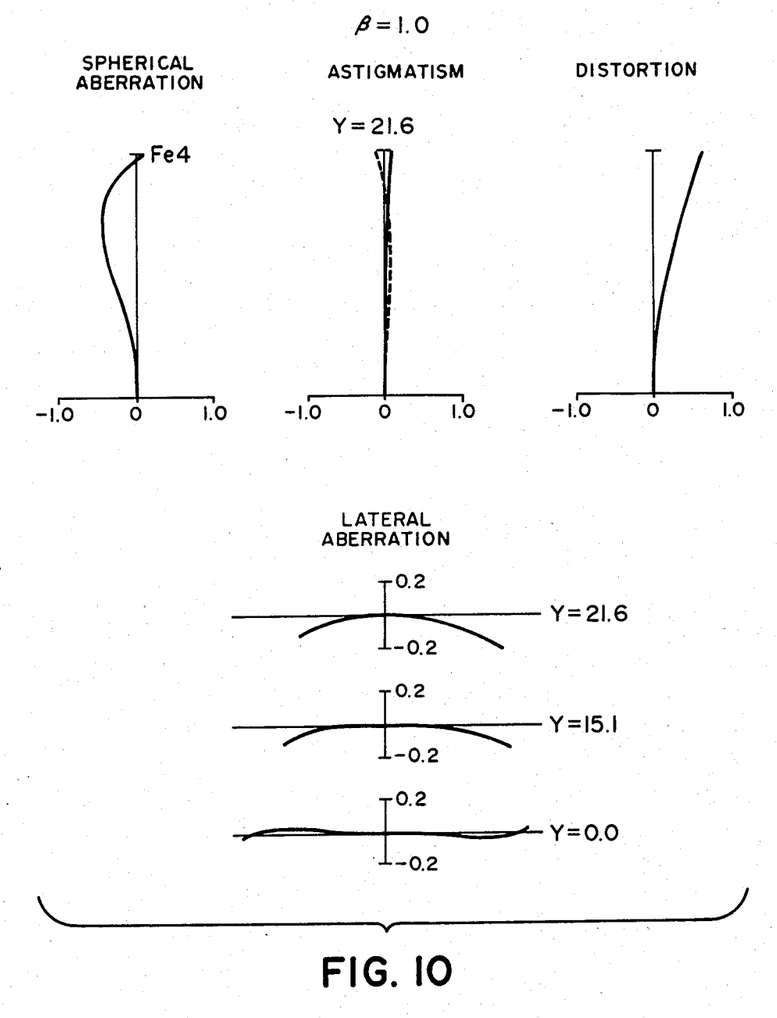

Similarly, FIG. 7 shows the arrangement of component lenses of Example 2 and FIGS. 8, 9 and 10 show aberrations thereof for object distance $d_0=\infty$, for $\beta=0.5$ and for $\beta=1.0$, respectively.

Figure 11:
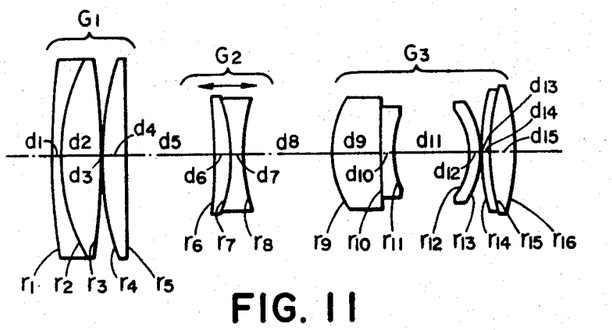
FIG. 11 shows the lens arrangement of Example 3 and and FIGS. 12, 13 and 14 show aberrations thereof for infinity, for ½ magnification and 1.0 magnification, respectively.
Figure 12:
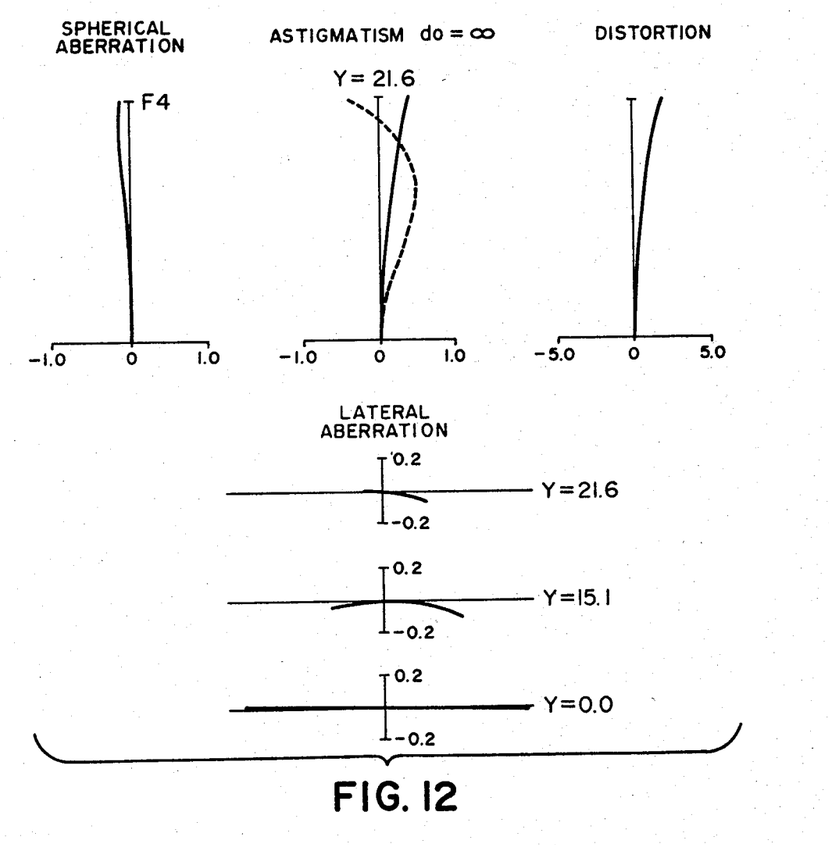
Figure 13:
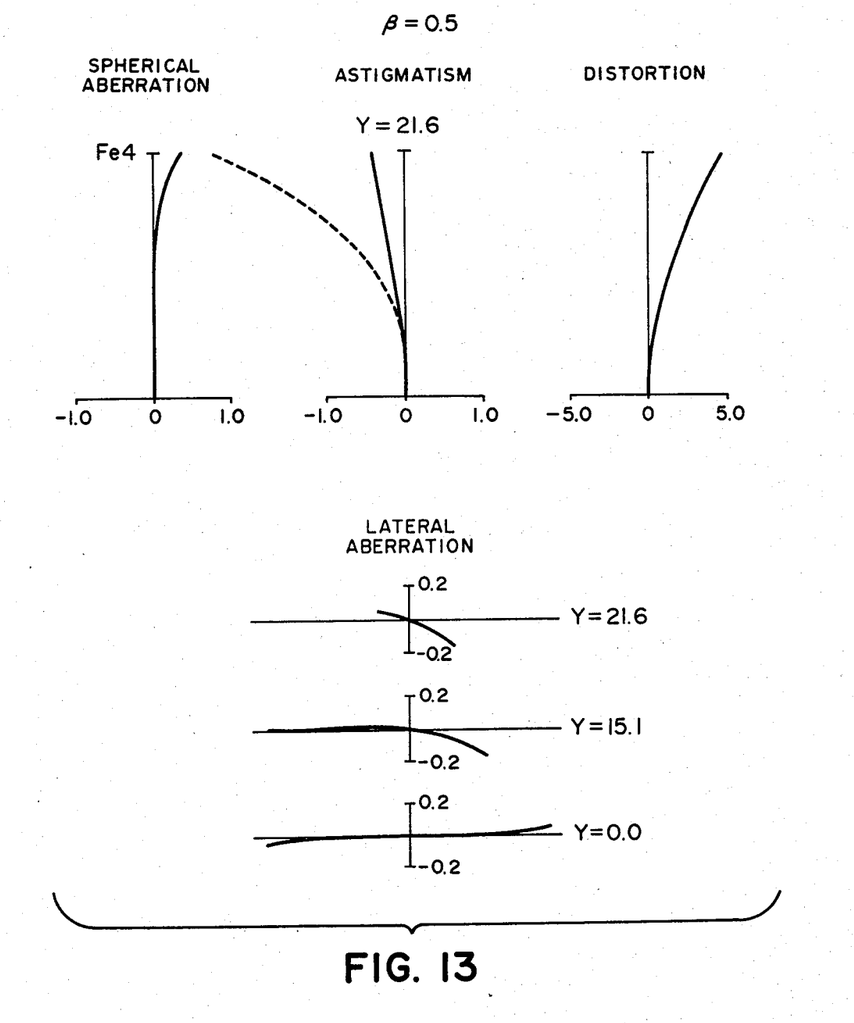
Figure 14:
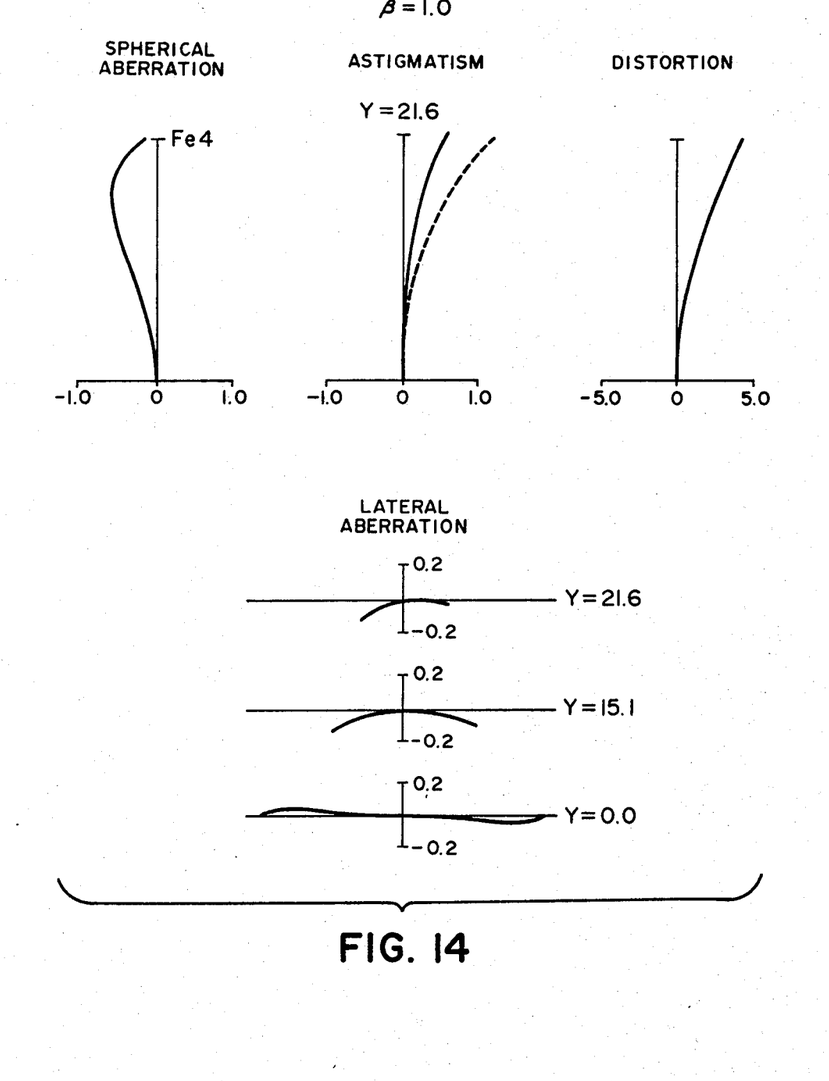

The lens arrangement of Example 3 is shown in FIG. 11. FIGS. 12, 13 and 14 show aberrations thereof for object distance $d_0=\infty$, for photographing magnification $\beta=0.5$ and for $\beta=1.0$, respectively.

In the aberration curves of the respective examples there are plotted amounts of aberrations measured while keeping constant the effective F-number Fe for different photographic magnifications.

As readily understood from the foregoing, the present invention has many advantages over the prior art. According to the invention, close-up photography can be carried out continuously with a simple mechanism and by a simple operation. When the lens system according to the invention is used in combination with a known light controllable strobo which has already been available for practical use, the photographic range can be further broadened under a sufficient illumination light. The photographic range thus obtained is far wider than that attainable according to the prior art.

If the lens system according to the invention is used in combination with a known constant light strobo, then it is possible to use the system as a GN (guide number) type photographic optical system. In this case, since the lens aperture of the system in the position for the shortest object distance is stopped down in accordance with the quantity of light emitted from the strobo, focusing performance can be improved by virtue of the invention. Also, the lens system according to the invention can be mounted in a single lens reflex camera provided with an automatic stopping-down mechanism to enjoy the advantages of the present invention. In this case, constant N.A. (numerical aperture) at the exit side is assured irrespective of change of magnification. Therefore, a constantly bright finder viewfield is provided.

In the arrangement of the lens system according to the invention, the second and third groups are connected in parallel with each other by paraxial rays. Therefore, it is also possible to use only the first and second groups as a magnification changing apparatus while making use of an existing lens as the third group.

While the invention has been particularly shown and described with reference to preferred embodiments thereof, it will be understood by those skilled in the art that the foregoing and other changes in form and details can be made therein without departing from the spirit and scope of the invention.

I claim:

1. A lens system capable of focusing continuously from infinite distance to close distance comprising, in the order from the object side,
    a converging first lens group disposed at a fixed distance from an image plane,
    a diverging second lens group disposed movably along the optical axis thereof for focusing, and
    a converging third lens group disposed at a fixed distance from the image plane,
    said diverging second lens group maintaining paraxial rays exiting therefrom substantially parallel throughout all the range of focusing,
    said first, second and third lens groups satisfying the following condition formulae:

$$1.0 < f_1/|f_2| < 1.4$$

$$1.6 \leq f_3/|f_2| \leq 2.2$$

wherein, $f_1$, $f_2$ and $f_3$ are focal lengths of said converging first lens group, diverging second lens group and converging third lens group, respectively.

2. A lens system according to claim 1 wherein said system satisfies the following condition:

$$1.6 \leq (f_3/R) \leq 4.2$$

wherein, R is the diameter of the image circle of said lens system.

3. A lens system according to claim 1 wherein said system satisfies the following condition:

$$1.6 \leq |\beta min| \leq 4$$

wherein, $\beta min$ is the minimum lateral magnification in the reversed direction of said first lens group.

4. A lens system according to claim 1 wherein said converging lens group comprises two positive lens components at least one of which has surfaces cemented together and wherein said two positive lens components satisfy the following conditions:

$$-0.25 < (r_b+r_a)/(r_b-r_a) < +0.15$$

$$+0.5 < (r_d+r_c)/(r_d-r_c) < +1.5$$

wherein,
  $r_a$ and $r_b$ are curvature radii of front and rear surfaces of the front positive lens component, respectively; and
  $r_c$ and $r_d$ are curvature radii of front and rear surfaces of the rear positive lens component.

5. A lens system according to claim 1 wherein said diverging second lens group comprises a cemented concavo-concave lens which satisfies the following condition:

$$-0.5 < (r_8+r_6)/(r_8-r_6) < 0$$

wherein,
  $r_6$ is the curvature raius of surface at the object field side of said concavo-concave lens; and
  $r_8$ is that at the image field side of the same.

6. A lens system according to claim 1 wherein said third lens group comprises a meniscus lens component composed of a positive lens and a negative lens cemented together with its convex surface facing toward the object side, a negative meniscus lens component with its convex surface facing toward the image side and a positive lens component arranged in this order as viewed from the object side.

7. A lens system according to claim 1 and as specified by the following data of lens elements:

| | $f_\infty = 121.168$ | F-number 4 | |
|---|---|---|---|
| r | d | nd | vd |
| 1 | 161.530 | 1.5000 | 1.80518 | 25.5 |
| 2 | 43.284 | 10.0000 | 1.71300 | 53.9 |
| 3 | −181.654 | .2000 | 1.0 | |
| 4 | 73.861 | 5.5000 | 1.71300 | 53.9 |
| 5 | −1704.595 | $d_5$ = Variable | 1.0 | |
| 6 | −108.243 | 4.7000 | 1.78470 | 26.1 |
| 7 | −34.631 | 2.3000 | 1.69680 | 55.6 |
| 8 | 49.671 | $d_8$ = Variable | 1.0 | |
| 9 | 26.350 | 13.6000 | 1.71300 | 53.9 |
| 10 | 250.000 | 2.9000 | 1.72342 | 38.0 |
| 11 | 27.045 | 25.7 | 1.0 | |

-continued

| | $f_\infty = 121.168$ | F-number 4 | | |
|---|---|---|---|---|
| 12 | −15.884 | 2.4000 | 1.78470 | 26.1 |
| 13 | −21.077 | .1000 | 1.0 | |
| 14 | 70.700 | 4.7000 | 1.62280 | 56.7 |
| 15 | −123.414 | | 1.0 | |
| M | 0 | −0.504 | −1.002 | |
| $d_0$ | ∞ | 295.169 | 175.712 | |
| $d_5$ | 0.925 | 16.141 | 31.167 | |
| $d_8$ | 36.408 | 21.192 | 6.166 | |
| Bf | 58.798 | 58.798 | 58.798 | |
| $f_1$ | 60.484 | $f_1/|f_2|$ | 1.15 | |
| $f_2$ | −52.5 | $f_3/|f_2|$ | 2.0 | |
| $f_3$ | 105.173 | $f_3/R$ | 2.43 | |
| R | 43.28 | $\beta$ min | 2.0 | |

Diaphragm plane is 1.8 before $r_9$.

wherein, data are arranged in the order of lens surface as viewed from the object side, and $f_1$, $f_2$ and $f_3$ have the same meanings as defined in claim 2;

r is the radius of curvature of lens surface;

d is the thickness at the center of lens and air spacing;

nd is the refractive index of lens;

$\nu d$ is Abb's number;

M is the photographic magnification of the total system;

$d_0$ is the distance from the object to the first surface, that is, working distance;

R is the diameter of image circle; and

Bf is back-focus.

8. A lens system according to claim 1 and as specified by the following data of lens elements:

| | $f_\infty = 162.0$ | F-number 4 | | |
|---|---|---|---|---|
| | r | d | nd | $\nu d$ |
| 1 | 240.000 | 7.0000 | 1.71300 | 53.9 |
| 2 | −179.034 | .1800 | 1.0 | |
| 3 | 110.000 | 11.7000 | 1.71300 | 53.9 |
| 4 | −92.000 | 1.5000 | 1.80518 | 25.5 |
| 5 | 552.084 | $d_5 =$ Variable | 1.0 | |
| 6 | −148.000 | 4.5000 | 1.78470 | 26.1 |
| 7 | −49.474 | 2.0000 | 1.69680 | 55.6 |
| 8 | 72.112 | $d_8 =$ Variable | 1.0 | |
| 9 | 34.350 | 17.4594 | 1.71300 | 53.9 |
| 10 | 320.945 | 3.7230 | 1.72342 | 38.0 |
| 11 | 34.066 | 27.345 | 1.0 | |
| 12 | −20.865 | 3.0811 | 1.78470 | 26.1 |
| 13 | −27.057 | .1284 | 1.0 | |
| 14 | 90.763 | 6.0338 | 1.62280 | 56.9 |
| 15 | −153.699 | | 1.0 | |
| M | 0 | −0.501 | −1.000 | |
| $d_0$ | ∞ | 412.0 | 250.5 | |
| $d_5$ | 2.351 | 27.351 | 52.351 | |
| $d_8$ | 55.903 | 30.903 | 5.903 | |
| Bf | 79.515 | 79.651 | 79.559 | |
| $f_1$ | 90.0 | $f_1/|f_2|$ | 1.2 | |
| $f_2$ | −75.0 | $f_3/|f_2|$ | 1.8 | |
| $f_3$ | 135.0 | $f_3/R$ | 3.12 | |
| R | 43.28 | $\beta$ min | 1.8 | |

Diaphragm plane is 1.215 before $r_9$.

wherein, data are arranged in the order of lens surface as viewed from the object side, and $f_1$, $f_2$ and $f_3$ have the same meanings as defined in claim 2;

r is the radius of curvature of lens surface;

d is the thickness at the center of lens and air spacing;

nd is the refractive index of lens;

$\nu d$ is Abbe's number;

M is the photographic magnification of the total system;

$d_0$ is the distance from the object to the first surface, that is, working distance;

R is the diameter of image circle; and

Bf is back-focus.

9. A lens system according to claim 1 and as specified by the following data of lens elements:

| | $f_\infty = 106.25$ | F-number 4 | | |
|---|---|---|---|---|
| | r | d | nd | $\nu d$ |
| 1 | 162.000 | .3868 | 1.80518 | 25.5 |
| 2 | 41.950 | 9.2456 | 1.71300 | 53.9 |
| 3 | −142.482 | .1849 | 1.0 | |
| 4 | 66.000 | 5.0850 | 1.71300 | 53.9 |
| 5 | 1678.852 | $d_5 =$ Variable | 1.0 | |
| 6 | −88.300 | 4.0051 | 1.78470 | 26.1 |
| 7 | −29.511 | 1.9599 | 1.69680 | 55.6 |
| 8 | 443.347 | $d_8 =$ Variable | 1.0 | |
| 9 | 20.450 | 10.9929 | 1.71300 | 53.9 |
| 10 | 202.077 | 2.3441 | 1.72342 | 38.0 |
| 11 | 21.393 | 17.5 | 1.0 | |
| 12 | −12.348 | 1.9399 | 1.78470 | 26.1 |
| 13 | −17.036 | .0808 | 1.0 | |
| 14 | 55.000 | 1.5000 | 1.71300 | 53.9 |
| 15 | 30.500 | 6.5000 | 1.50137 | 56.5 |
| 16 | −42.981 | | 1.0 | |
| M | 0 | −0.500 | −1.000 | |
| $d_0$ | ∞ | 263.0 | 156.9 | |
| $d_5$ | 11.184 | 25.9 | 40.616 | |
| $d_8$ | 35.581 | 20.865 | 6.149 | |
| Bf | 46.256 | 46.297 | 46.269 | |
| $f_1$ | 55.921 | $f_1/|f_2|$ | 1.25 | |
| $f_2$ | −44.737 | $f_3/|f_2|$ | 1.9 | |
| $f_3$ | 85.0 | $f_3/R$ | 1.96 | |
| R | 43.28 | $\beta$ min | 1.9 | |

Diaphragm plane is 0.765 before $r_9$.

wherein, data are arranged in the order of lens surfaces as viewed from the object side, and $f_1$, $f_2$ and $f_3$ have the same meanings as defined in claim 2;

r is the radius of curvature of lens surface;

d is the thickness at the center of lens and air spacing;

nd is the refractive index of lens;

$\nu d$ is Abbe's number;

M is the photographic magnification of the total system;

$d_0$ is the distance from the object to the first surface, that is, working distance;

R is the diameter of image circle; and

Bf is back-focus.

* * * * *